Aug. 9, 1966  J. H. MOULTON  3,265,822
TIRE PRESSURE INDICATING DEVICE
Filed Dec. 14, 1964
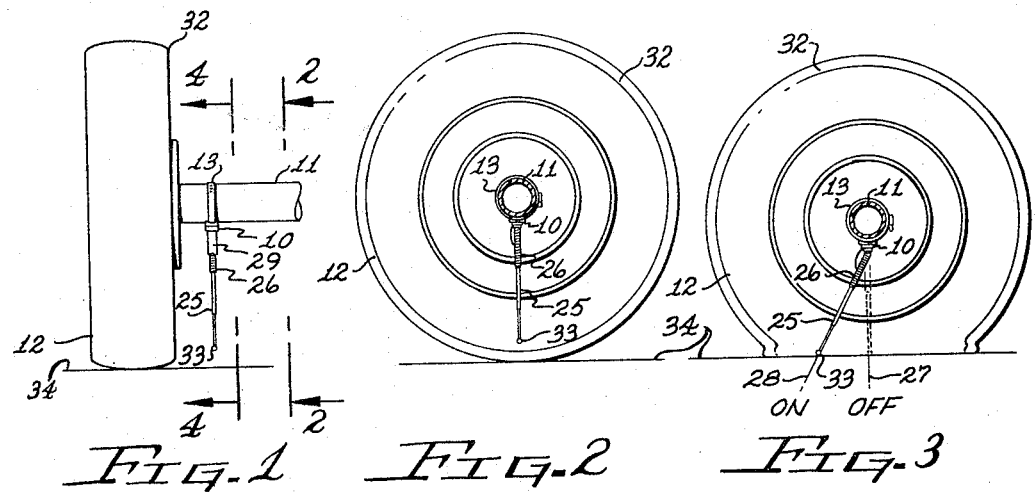
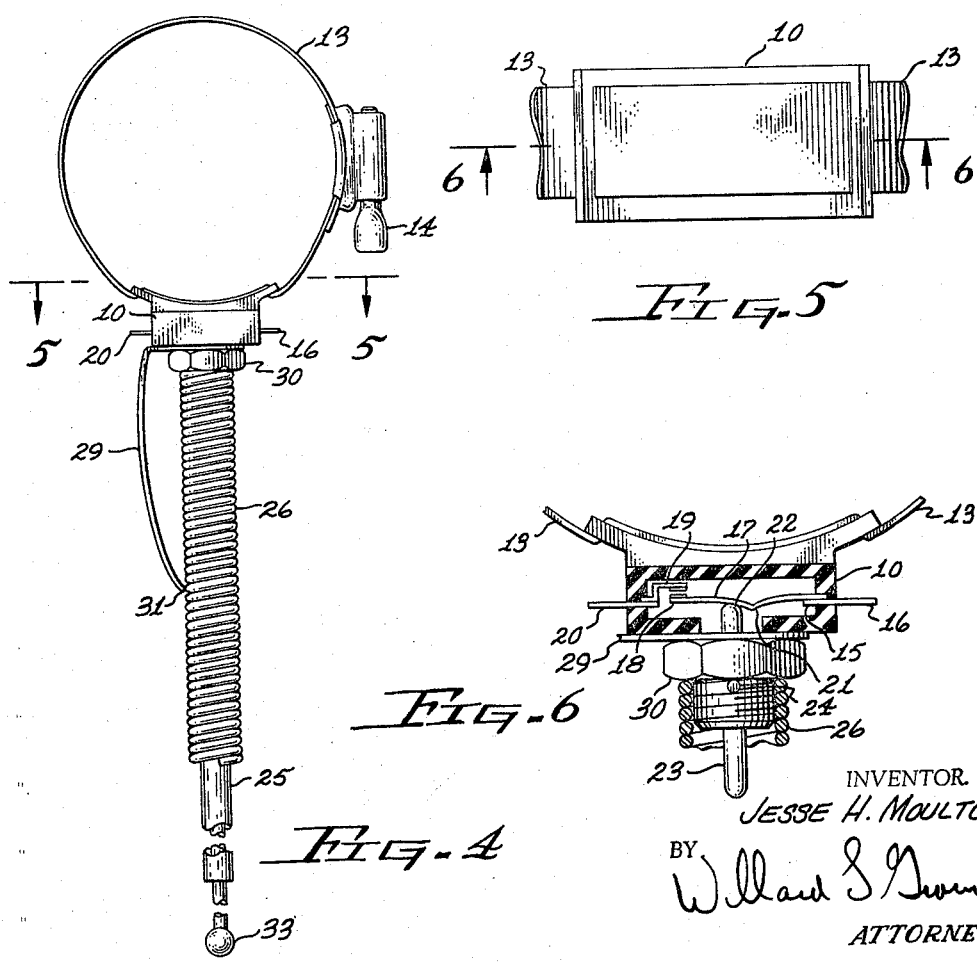
INVENTOR.
JESSE H. MOULTON
BY Willard S. Brown
ATTORNEY United States Patent Office 3,265,822
Patented August 9, 1966

3,265,822
TIRE PRESSURE INDICATING DEVICE
Jesse H. Moulton, 817 S. Country Club Drive,
Mesa, Ariz. 85201
Filed Dec. 14, 1964, Ser. No. 418,145
2 Claims. (Cl. 200—61.24)

This invention pertains to electrical control switches and is particularly directed to a tire pressure indicating and warning control switch for motor vehicles and the like.

One of the objects of this invention is to provide a highly efficient and sensitive control switch for indicating the pressure condition of tires of a motor vehicle.

Another object is to improve the leverage of the operating arm for the switch for accurate remote control.

A further object is to provide a housing structure for the switch which is particularly adapted to be mounted on the motor vehicle chassis.

A still further object is to provide a novel universal mounting arrangement for the switch actuating rod.

And it is a further object to provide a simple and effective device for indicating the inflated condition of a vehicle tire.

Further features and advantages of this invention will appear from a detailed description of the drawings in which:

FIG. 1 is a fragmentary of a vehicle axle and wheel showing the control switch incorporating the features of this invention.

FIG. 2 is a sectional view on the line 2—2 of FIG. 1.

FIG. 3 is a sectional view similar to FIG. 2 showing the situation with the tire deflated.

FIG. 4 is an enlarged sectional view of the control switch indicated by the line 4—4 of FIG. 1.

FIG. 5 is an enlarged fragmentary plan view indicated by the line 5—5 in FIG. 4.

FIG. 6 is a view on the line 6—6 of FIG. 5.

As an example of one embodiment of this invention, there is shown a tire pressure indicating control switch having an insulated switch housing 10 which may be rigidly fixed to the axle 11 of a vehicle having the usual road wheel 12 by a suitable adjustable band clamp 13 having the usual clamping screw 14.

The control switch mechanism within the housing 10 comprises a contact strip 15 fixed in the housing 10 having a terminal 16. A spring contactor 17 has one end fixed to the strip 15 and its other free end 18 adapted to move in and out of contact with the contact strip 19 fixed in the housing 10 and having the terminal 20. The spring contactor 15 has the raised convex portion 21 which is engaged by the actuating tip 22 of the trip plunger 23 mounted on a suitable pin 24 carried in the housing 10.

An actuating rod 25 is connected by a universally deflectible spring 26 to the trip plunger 23 so that when the rod 25 is deflected from its normally vertical "off" position 27 to a rearward-tilted "on" position 28 of contact of the free end 18 of the spring contactor 17 with the contact strip 19. An auxiliary flat spring 29 fixed to the housing 10 by a suitable nut 30 has its outer end 31 adapted to engage the outer end of the spring 26 to assure return of the rod 25 from tilted "on" position 28 to normal vertical "off" position 27.

In operation: the terminals 16 and 20 are connected in series with a source of electrical energy, such as a batttery, and a warning light located for the attention of the vehicle operator. When the tire 32 is properly inflated, FIG. 2, the tip 33 of the actuating rod 25 of the switch clears the road surface 34 and the switch and warning light remain "off." Should the tire become deflated or overloaded, FIG. 3, the tip 33 will engage and be deflected rearwardly to "on" position 28 causing the warning light to indicate to the operator of the vehicle that the tire should be inflated or the overloading taken care of. Obviously, each tired wheel of a vehicle would be provided with a control switch as described.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A vehicle tire pressure indicating and warning device comprising in combination:
 (A) an insulated switch housing,
 (B) means for demountably securing said insulated switch housing on a motor vehicle housing,
 (C) a normally open control switch within said insulated switch housing including,
 (D) a terminal fixed in said insulated switch housing,
 (E) a spring contactor having one end fixed to said terminal,
 (F) a contact on the outer free end of said spring contactor arranged to move relative to a second terminal contact fixed in said insulated switch housing,
 (G) a raised convex portion on said spring contactor,
 (H) a trip plunger pivotally mounted in said insulated switch housing having one inner end operatively engaging said raised convex portion of said spring contactor,
 (I) and actuating road contacting rod,
 (J) a universally deflectable spring fixed to the upper end of said actuating rod and having its other upper end fixed to said insulated switch housing and surrounding the lower outer end of said trip plunger so that lateral deflection of said universally deflectable spring causes the inside of said spring to engage the lower outer end of said trip plunger to actuate said switch to closed condition.

2. In a vehicle tire pressure indicating and warning device as set forth in claim 1 wherein said universally deflectable spring includes an auxiliary flat spring fixed to said insulated switch housing and having its outer end arranged to engage the lower outer end of said universally deflectable spring.

References Cited by the Examiner
UNITED STATES PATENTS 2,882,362  4/1959  Carter _____ 200—61.24
2,962,571  11/1960  Fanichkowsky _____ 200—159

BERNARD A. GILHEANY, Primary Examiner.

R. N. ENVALL, Jr., Assistant Examiner.